US008827516B2

(12) United States Patent
Stakoe et al.

(10) Patent No.: US 8,827,516 B2
(45) Date of Patent: Sep. 9, 2014

(54) MODULAR GRAB HANDLE WITH INTEGRAL LAMP ATTACHING SYSTEM

(75) Inventors: John Andrew Stakoe, Bloomfield Hills, MI (US); Chi Li, Farmington Hills, MI (US); Bhavani Thota, Macomb, MI (US); Guillermo Alanis, Naucalpan (MX); Jesus Miranda Lujan, Col. Torres (MX)

(73) Assignee: Ford Global Technologies, LLC, Dearborn, MI (US)

(*) Notice: Subject to any disclaimer, the term of this patent is extended or adjusted under 35 U.S.C. 154(b) by 179 days.

(21) Appl. No.: 13/307,312

(22) Filed: Nov. 30, 2011

(65) Prior Publication Data
US 2013/0135884 A1 May 30, 2013

(51) Int. Cl.
*B60Q 1/00* (2006.01)
*B60Q 1/26* (2006.01)
*B60Q 3/02* (2006.01)
*B60N 3/02* (2006.01)

(52) U.S. Cl.
CPC .............. *B60Q 3/0233* (2013.01); *B60N 3/023* (2013.01)
USPC ........................................................ 362/488

(58) Field of Classification Search
CPC .................................................... B60Q 3/0233
USPC .................................................. 362/488, 490
See application file for complete search history.

(56) References Cited

U.S. PATENT DOCUMENTS

| | | | |
|---|---|---|---|
| 4,686,609 A | 8/1987 | Dykstra et al. | |
| D327,865 S | 7/1992 | Falcoff et al. | |
| 5,366,127 A | 11/1994 | Heinz | |
| 6,076,233 A * | 6/2000 | Sasaki et al. | 16/444 |
| 6,095,469 A | 8/2000 | Von Alman | |
| 6,523,888 B1 | 2/2003 | Yan et al. | |
| 6,701,995 B1 | 3/2004 | Bogdanski | |
| 6,793,385 B2 | 9/2004 | Tiesler et al. | |
| 7,104,675 B2 | 9/2006 | Chen | |
| 2004/0036304 A1* | 2/2004 | Thompson et al. | 296/1.02 |
| 2006/0104072 A1* | 5/2006 | Chen | 362/493 |

OTHER PUBLICATIONS

"94-97 Chrysler New Yorker Map Light Grab Handle Rear L," http://cgi.ebay.com/ebaymotors/94-97-Chrysler-New-Yorker-Map-Light-Grab-Handle-Rear-L_W0QQcmdZViewItemQQcategoryZ42612 QQitemZ370511523790#vi-content (3 pages).
"Vent Grab Handle Dome Light Toyota Sienna 04 05 06 RH R," http://compare.ebay.com/like/130381501230?var=lv <yp=AllFixedPriceItemTypes&var=sbar&_lwgsi=y (2 pages).
1999 Dodge Intrepid RHR Roof Grab handle W/ Light F426, http://cgi.ebay.com/ebaymotors/1999-Dodge-Intrepid-RHR-Roof-Grab-handle-W-Light-F426_W0QQcmdZViewItemQQcategory Z42612QQitemZ130390165443#vi-content (1 page).
"Interior grab handle w/light—left rear for 92-95 Pont," http://compare.ebay.com/like/150123010731?var=lv <yp=AllFixedPriceItemTypes&var=sbar&_lwgsi=y (2 pages).

* cited by examiner

*Primary Examiner* — Anh Mai
*Assistant Examiner* — Zachary J Snyder
(74) *Attorney, Agent, or Firm* — Vichit Chea; Price Heneveld LLP

(57) ABSTRACT

An interior grab handle and lamp assembly for a vehicle including a bracket configured for attachment by fasteners to a structural roof member. The bracket is disposed on an back side surface of a headliner. An elongate handle is operably connected to the bracket via first and second mounting members disposed on an visible surface of the headliner. A light source is operably connected with an intermediate portion of the bracket. The light source is disposed on the visible surface of the headliner between the first and second mounting members.

20 Claims, 6 Drawing Sheets

MODULAR GRAB HANDLE WITH INTEGRAL LAMP ATTACHING SYSTEM

FIELD OF THE INVENTION

The present invention generally relates to grab handles for vehicles, and more particularly to a grab handle and lamp attachment for an interior of a motor vehicle.

BACKGROUND OF THE PRESENT INVENTION

Grab handles have become a standard feature of passenger vehicles. They are provided in vehicles to assist occupants as they enter and exit a vehicle, as well as to maintain their seated position when driving over rough terrain. A wide variety of grab handle designs are available, but most are attached to the vehicle roof structure, often through the headliner. Grab handle assemblies typically include a handle and multiple brackets and backing members. Some grab handles are provided with additional features, such as a garment or a coat hook.

It is further known to provide overhead lighting in passenger vehicles, the most common being the well known dome lamp. Sources of light, sometimes referred to as map lamps or courtesy lighting, are located in various convenient locations in the overhead area of the vehicle. These lights maybe be independently mounted to the headliner or the roof structure, or may be incorporated into other overhead devices, such as overhead consoles. Further, lighting has heretofore been provided in the handle portion of a grab handle assembly, as well as in the trim bezel of a grab handle assembly.

SUMMARY OF THE PRESENT INVENTION

One aspect of the present invention includes an interior grab handle and lamp assembly for a vehicle including a bracket configured for attachment by fasteners to a structural roof member. The bracket is disposed on a back side surface of a headliner. An elongate handle is operably connected to the bracket via first and second mounting members disposed on a visible surface of the headliner. A light source is operably connected with an intermediate portion of the bracket. The light source is disposed on the visible surface of the headliner between the first and second mounting members.

Another aspect of the present invention includes an interior grab handle and lamp assembly for a vehicle including an elongate bracket disposed between a roof of the vehicle and a first side of a headliner. A grab handle is operably connected to first and second ends of the bracket. The grab handle is disposed proximate a second side of the headliner. A light source is operably connected to the bracket between the first and second ends of the bracket.

Yet another aspect of the present invention includes a method of installing an interior grab handle and lamp assembly in a vehicle including positioning a bracket between a roof of the vehicle and a first side of a headliner. A grab handle is pivotally connected to first and second ends of the bracket. A light source is operably connected to an intermediate portion of the bracket. The grab handle and the light source are exposed to an interior of the vehicle.

These and other aspects, objects, and features of the present invention will be understood and appreciated by those skilled in the art upon studying the following specification, claims, and appended drawings.

DETAILED DESCRIPTION OF EMBODIMENTS

Figure 1:
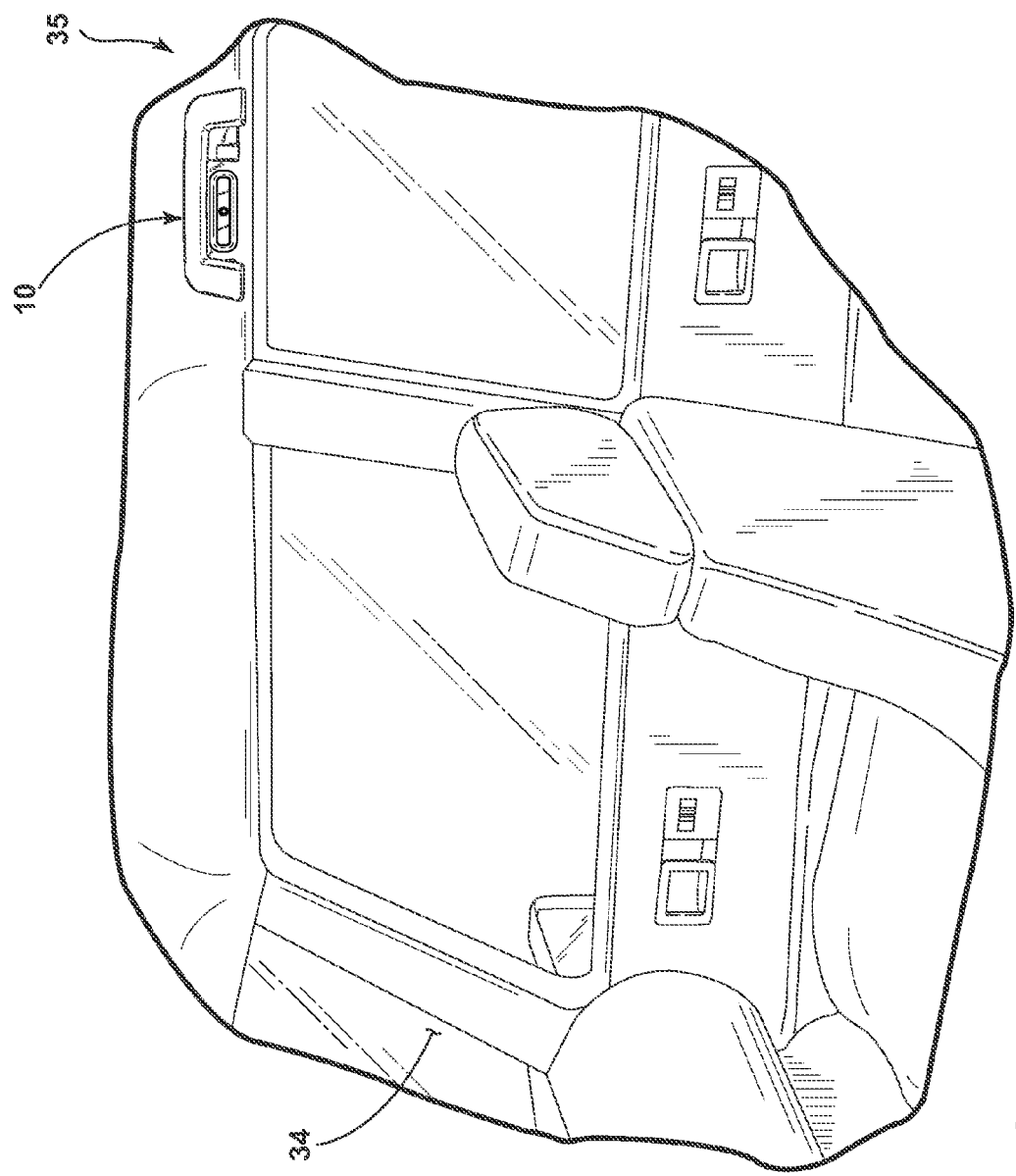
FIG. 1 is a side elevational view of an interior grab handle and lamp assembly mounted to an overhead portion of a vehicle.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
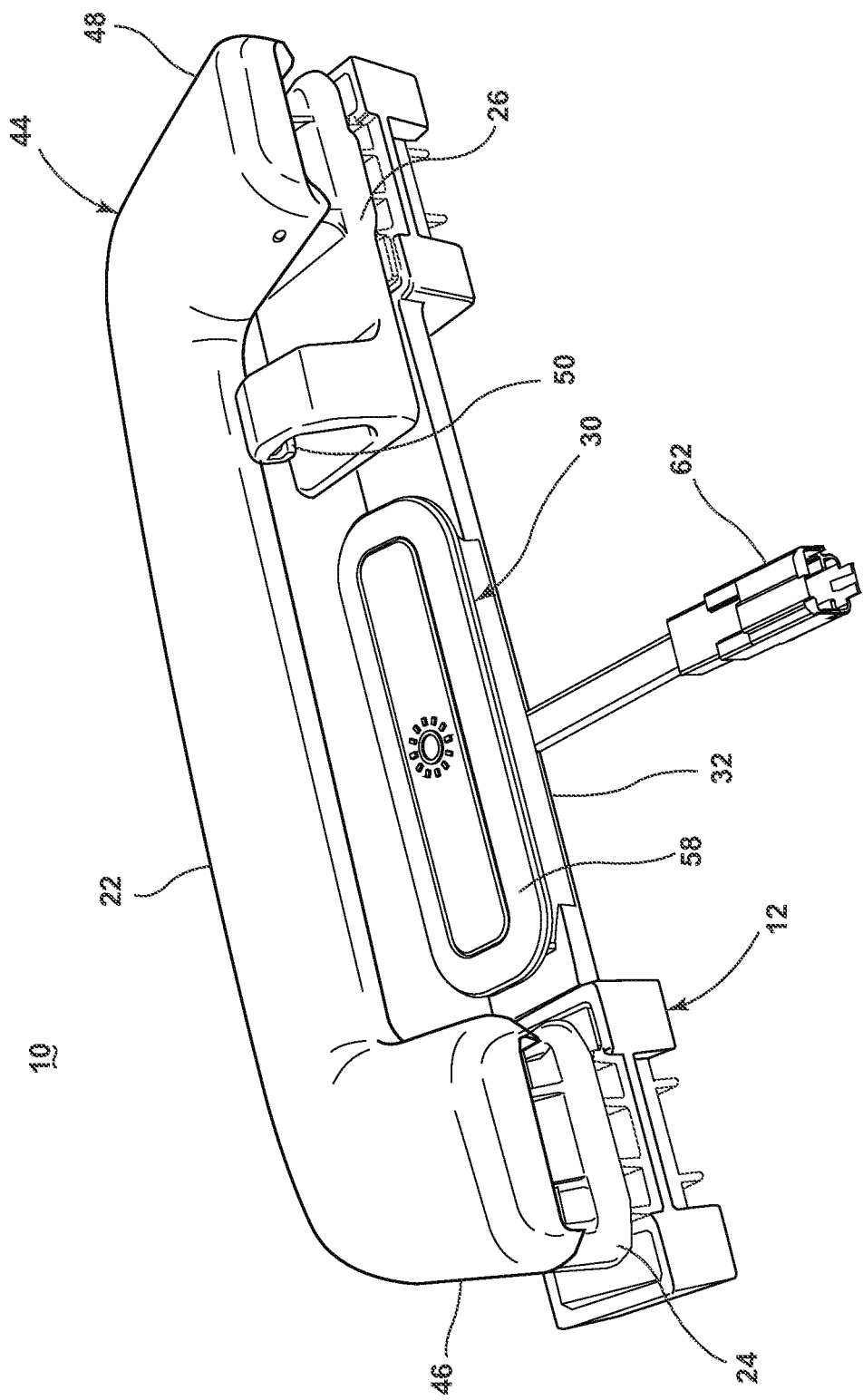
FIG. 2 is a bottom perspective view of the grab handle and lamp assembly of the present invention.
Figure 6:
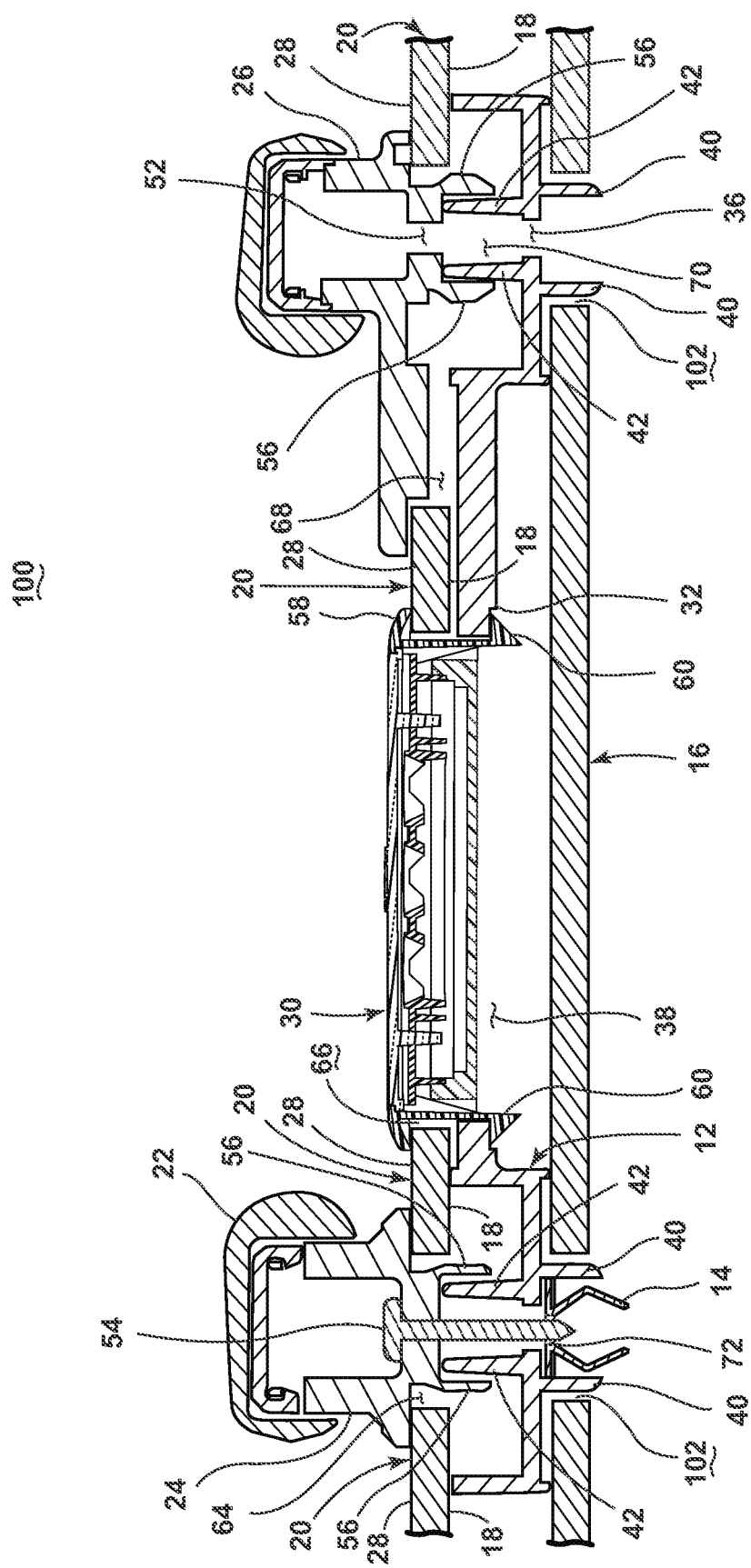
FIG. 6 is a cross-sectional view of the grab handle and lamp assembly of FIG. 2, including a portion of a headliner and a structural roof member of the vehicle, with a fastener and threaded fastener in the right portion of the handle removed for illustrative purposes.

Referring to FIGS. 1, 2, and 6, reference numeral 10 generally designates an interior grab handle and lamp assembly for a vehicle 35. The interior grab handle and lamp assembly 10 comprises a bracket 12 configured for attachment by at least one fastener 14 to a structural roof member 16 of the vehicle 35. The bracket 12 is disposed on a back side surface 18 of a headliner 20. An elongate handle 22 is operably connected to the bracket 12 via first and second mounting members, referred to herein as first and second bezels 24 and 26, disposed on a visible surface 28 of the headliner 20. A light source, illustrated herein as lamp 30, is operably connected with an intermediate portion 32 of the bracket 12. The lamp 30 is disposed on the visible surface 28 of the headliner 20, between the first and second bezels 24, 26.

Figure 3:
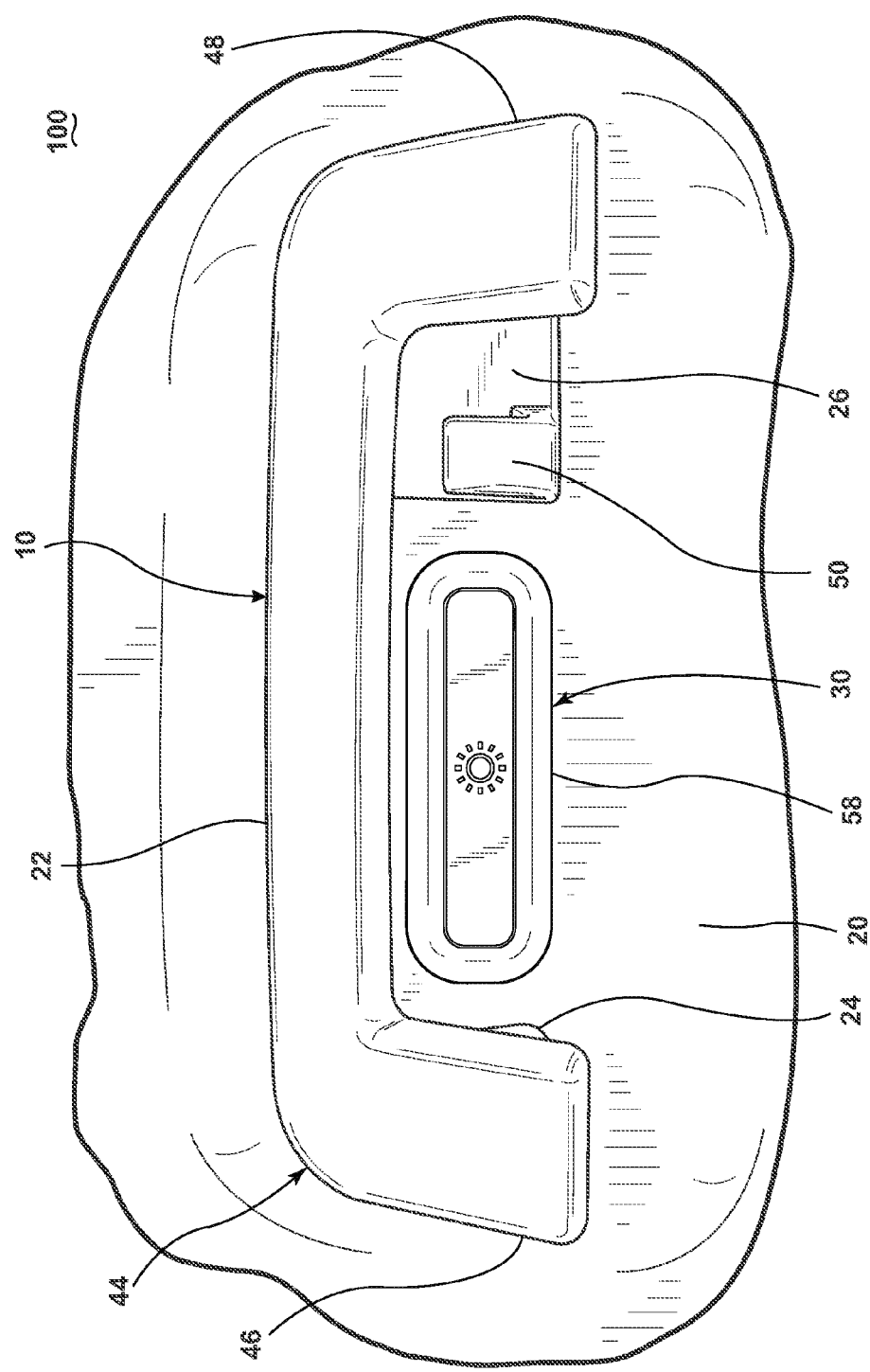
FIG. 3 is a side elevational view of the grab handle and lamp assembly of FIG. 2 mounted to the overhead portion of a vehicle.
Figure 4:
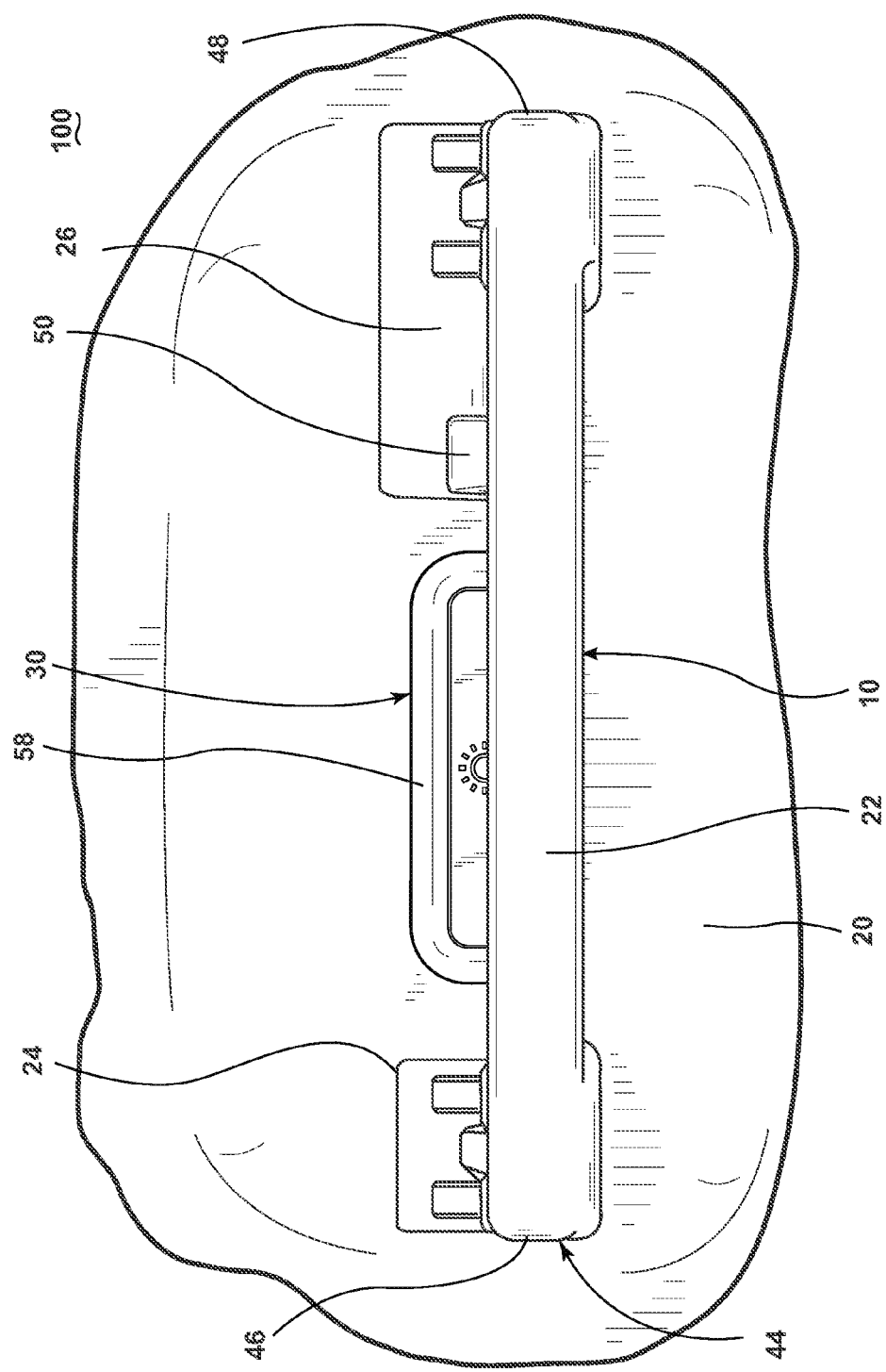
FIG. 4 is a side elevational view of the grab handle and lamp assembly of FIG. 2 mounted to the overhead portion of a vehicle, and illustrating a deployed position.

Referring now to FIGS. 3 and 4, the grab handle and lamp assembly 10 of the present invention is for use in a passenger compartment 34 (FIG. 1) of the motor vehicle 35. The grab handle and lamp assembly 10 is operably connected with the structural roof member 16 (FIG. 6). The headliner 20 covers an interior side of the structural roof member 16 such that the structural roof member 16 cannot be seen from inside the vehicle 35. As illustrated in FIG. 4, the handle 22 is pivotally mounted to the first and second bezels 24, 26. Accordingly, the handle 22 is pivotal between a stowed position (FIG. 3) and a deployed position (FIG. 4). In this configuration, a biasing member, such as a spring, may be utilized to bias the handle 22 to the stowed position. Alternatively, it is contemplated that the handle 22 may be fixedly mounted to the first and second bezels 24, 26.

Figure 5:
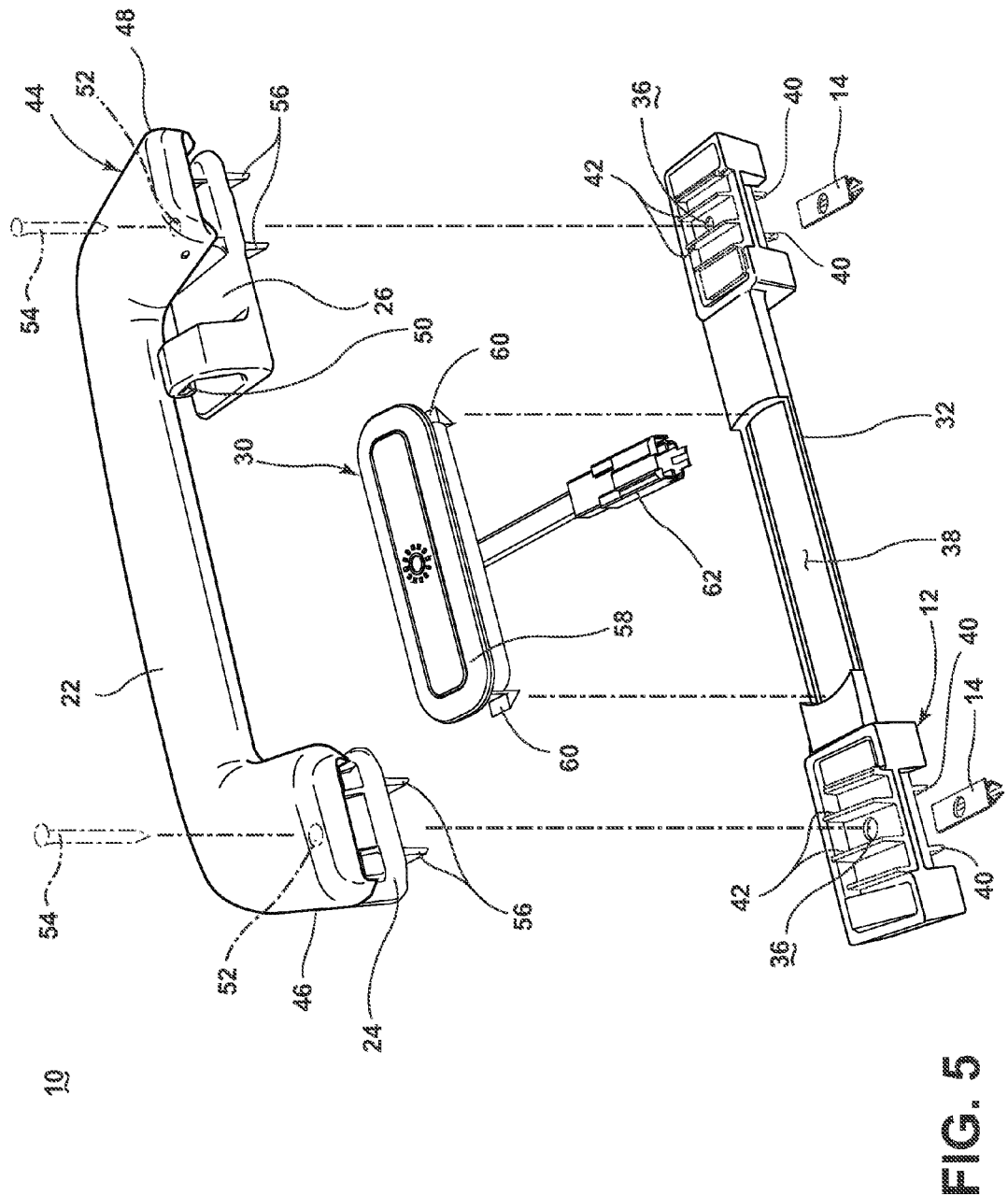
FIG. 5 is an exploded perspective view of the grab handle and lamp assembly of FIG. 2.

Referring to FIGS. 5 and 6, as mentioned above, the grab handle and lamp assembly 10 includes the bracket 12, which is a generally rectangular member having various structural features that add strength and rigidity to the bracket 12, as disclosed below. The bracket 12 also includes two mounting apertures 36 and a central lamp opening 38. A pair of standoff ribs 40 and a pair of support ribs 42 are located proximate each mounting aperture 36, though on opposite surfaces of the bracket 12. The standoff ribs 40 extend toward an exterior of the vehicle 35, while the support ribs 42 extend toward an interior of the vehicle 35.

The elongate handle 22 and the first and second bezels 24, 26 generally define a grab handle assembly 44. The elongate handle 22 has a first end 46 and a second end 48. The first bezel 24 is disposed at the first end 46, and the second bezel 26 is disposed at the second end 48. It is contemplated that one of the first and second bezels 24, 26 includes an article hook 50, also commonly referred to as a coat hook or garment hook. It will be understood that the article hook 50 may include a variety of constructions and may be attached to any one or more of the first bezel 24, second bezel 26, or elongate handle 22. Further, the elongate handle 22 may be fixed or rotatably coupled to the first bezel 24 and second bezel 26. In the illustrated embodiment, the article hook 50 is integral to the second bezel 26. Further, each of the first and second bezels 24, 26 has an aperture 52 through which a threaded fastener 54 can pass, and standoff ribs 56 are located proximate each aperture 52.

The lamp 30 includes a trim ring 58, a retention member, such as a pair of opposed retention legs 60, an electrical connector 62, and a source of illumination. The source of illumination can be any suitable device for providing light to the interior of the vehicle 35, such as a light-emitting diode (LED), an incandescent bulb, or a fluorescent lamp. The lamp 30, as illustrated, is operated by push-push actuation, wherein a user pushes the lamp 30 to activate the lamp 30 and pushes the lamp 30 a second time to deactivate the lamp 30. However, various other actuation devices may be employed, as understood by one having ordinary skill in the art. It is also contemplated that the lamp assembly 10 may be operably linked with an interior lighting system of the vehicle 35 that activates upon unlocking of the vehicle 35, or opening of a door of the vehicle 35.

The headliner 20 includes a plurality of cutouts which coordinate with the grab handle assembly 44 and the lamp 30. Specifically, first, second, and third apertures 64, 66, and 68 are sized such that the first bezel 24, the lamp 30, and the second bezel 26 can extend at least partially therethrough.

In operation, the bracket 12 is disposed on the back side surface 18 of the headliner 20, and the mounting apertures 36 and lamp opening 38 are aligned with the first, second, and third apertures 64, 66, 68. The grab handle assembly 44 is disposed on the visible surface 28 of the headliner 20, and the apertures 52 of the first and second bezels 24, 26 are also aligned with the mounting apertures 36 and first and third apertures 64, 68. In alignment, these components form a passage 70 therethrough. Further, the standoff ribs 56 of the first and second bezels 24, 26 are adapted to align with the support ribs 42 of the bracket 12. The fastener 14 is placed between the two standoff ribs 40, exterior to each of the mounting apertures 36, and the threaded fastener 54 is installed into the passage 70 and through a center hole 72 in the fastener 14.

Threading the fastener 54 through the passage 70 and into the center hole 72 of the fastener 14 removably secures the grab handle assembly 44 to the bracket 12. The headliner 20 is captured between the first and second bezels 24, 26 and the bracket 12, thereby mounting the grab handle assembly 44 to the headliner 20. Further, the first and second bezels 24, 26 extend beyond the first and third apertures 64, 68 of the headliner 20 such that, when installed in a vehicle 35, the apertures 64, 68 are not visible from within the passenger compartment 34.

The lamp 30 is assembled to the headliner 20 by feeding the electrical connector 62 through the second aperture 66. The lamp 30 is then aligned with the second aperture 66 and inserted into the lamp opening 38 of the bracket 12. The retention member, such as the retention legs 60 illustrated, are designed to snap into the lamp opening 38, thereby retaining the lamp 30 to the bracket 12 at the perimeter of the lamp opening 38, thereby securing the lamp 30 in position against the headliner 20. The trim ring 58 is disposed on the visible surface 28 of the headliner 20 and extends beyond the second aperture 66 of the headliner 20 such that the second aperture 66 is not visible from within the passenger compartment 34.

Together, the modular grab handle and lamp assembly 10 and the headliner 20 define a handle system 100 for mounting to the interior of the structural roof member 16 of the vehicle 35. The handle system 100 is moved into position within the interior of the vehicle 35 (FIG. 1), and the electrical connector 62 is electrically connected to an electrical system of the vehicle 35 by a mating vehicle electrical connector. The handle system 100 is then secured in place by snapping the fasteners 14 into corresponding holes 102 in the structural roof member 16.

The handle system 100 provides several benefits to both the vehicle 35 itself and the assembly 10 thereof. To begin, the handle system 100 eliminates the manufacturing step of installing separate grab handles and lamps to the vehicle 35 during the final manufacture of the vehicle 35. Instead, the headliner 20 is installed in the vehicle 35 with the grab handle and lamp assembly 10 already mounted thereto, thereby simplifying the manufacturing process. Additionally, the manufacture of the handle system 100 can be performed off-line at another location within the final assembly plant, or off-site by a components supplier.

Another benefit the grab handle and lamp assembly 10 provides is with respect to the serviceability of the lamp 30. Because the lamp 30 is installed from the visible surface 28 of the headliner 20, the lamp 30 can be serviced, in the case of a burned out bulb, for example, without having to remove the entire headliner 20. Instead, the retention legs 60 are flexed away from the bracket 12 and the lamp 30 is pulled out and removed by disconnecting the electrical connector 62. A new lamp 30 is then installed, as described above.

Yet another benefit that the grab handle and lamp assembly 10 provides is in relation to the deployment of overhead side curtain airbag modules that are frequently being used in current vehicles 35. Typically, grab handles are attached directly to the structural roof member 16 and an airbag module is also attached to the structural roof member 16 at a location near the grab handle. When an overhead airbag module is deployed, the airbag curtain pushes the headliner 20 away from the structural roof member 16, which can cause damage to or detachment of the components mounted in that area. The bracket 12 of the grab handle and lamp assembly 10 of the present invention adds protection, particularly to the lamp 30, during deployment of the airbag module. The bracket 12 adds stability and rigidity to the grab handle and lamp assembly 10 and reduces the amount of force that the lamp 30 experiences from the deployment of the airbag module.

One method of installing the interior grab handle and lamp assembly 10 in the vehicle 35 includes positioning the bracket 12 between the roof of the vehicle 35 and the first side of the headliner 20. The grab handle 22 is pivotally connected to first and second ends of the bracket 12 and the light source 30 is operably connected to the intermediate portion 32 of the bracket 12. The grab handle 22 and the light source 30 are exposed to the interior of the vehicle 35. The bracket 12 is configured for attachment by fasteners 14 to the roof of the vehicle 35. The grab handle 22 is attached by threaded fasteners 14 to the bracket 12 and the grab handle 22 and light source 30 are positioned on the second side of the headliner 20. The light source 30 is serviceable from the second side of the headliner 20. The grab handle and lamp assembly 10 can be installed in a variety of positions in the vehicle 35 near the driver's seat or any passenger seat. Additionally, the lamp 30 may be generally installed to emit light through the interior of the cabin of the vehicle 35 or direct light to a predetermined position inside the vehicle 35.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An interior grab handle and lamp assembly for a vehicle comprising:
    a bracket configured for attachment by fasteners to a structural roof member, the bracket disposed on a back side surface of a headliner, wherein the bracket is in abutting contact with both the structural roof member and the back side surface of the headliner and the bracket is disposed completely behind the headliner;
    an elongate handle operably connected to the bracket via first and second mounting members disposed on a visible surface of the headliner, wherein the bracket includes a first set of aligning ribs that engage the mounting members and a second set of aligning ribs that engage the structural roof member, and wherein the first and second sets of aligning ribs extend perpendicularly from the bracket and at least partially position the elongate handle relative to the headliner and the structural roof member; and
    a light source operably connected with an intermediate portion of the bracket, wherein the light source is disposed on the visible surface of the headliner between the first and second mounting members.

2. The interior grab handle and lamp assembly of claim 1, wherein the handle has a first end and a second end, and the first mounting member is disposed at the first end and the second mounting member is disposed at the second end.

3. The interior grab handle and lamp assembly of claim 2, wherein one of the first and second mounting members includes an article hook.

4. The interior grab handle and lamp assembly of claim 1, wherein the handle is pivotally mounted to the first and second mounting members.

5. The interior grab handle and lamp assembly of claim 1, wherein the handle is fixedly mounted to the first and second mounting members.

6. The interior grab handle and lamp assembly of claim 1, wherein the light source is operable to provide illumination to the vehicle interior and comprises an electrical connector for electrically connecting the light source to a vehicle electrical system.

7. The modular grab handle and lamp assembly of claim 6, wherein the light source is operated by push-push actuation.

8. The interior grab handle and lamp assembly of claim 1, wherein the headliner comprises a plurality of apertures through which the fasteners of the grab handle and lamp assembly extend.

9. The interior grab handle and lamp assembly of claim 8, wherein the modular grab handle, lamp assembly, and headliner define a handle system that mounts to the structural roof member of the vehicle.

10. An interior grab handle and lamp assembly for a vehicle comprising:
    an elongate bracket, having alignment ribs, concealed between a vehicle roof and a first side of a headliner;
    a grab handle proximate a second side of the headliner and operably connected to first and second bracket ends and positioned by the alignment ribs; and
    a light source and a permanently-deployed article hook operably connected to the bracket between the first and second bracket ends.

11. The interior grab handle and lamp assembly of claim 10, wherein the grab handle is pivotally mounted to first and second mounting members.

12. The interior grab handle and lamp assembly of claim 11, wherein one of the first and second mounting members includes the article hook.

13. The interior grab handle and lamp assembly of claim 10, wherein the grab handle is pivotally coupled to the bracket and moveable between a deployed position and a stowed position.

14. The interior grab handle and lamp assembly of claim 13, further comprising:
    a spring member that biases the grab handle to the stowed position.

15. The interior grab handle and lamp assembly of claim 10, wherein the light source includes a retention member adapted for snap-fit engagement with the bracket.

16. A method of installing an interior grab handle assembly in a vehicle comprising:
    concealing a bracket between a vehicle roof and a back side of a headliner;
    pivotally connecting a grab handle to first and second bracket ends,
    positioning the grab handle using perpendicularly extending alignment ribs of the bracket;
    operably connecting a light source to an intermediate portion of the bracket; and
    exposing the grab handle and the light source to a vehicle interior.

17. The method of claim 16, wherein the bracket is configured for attachment by fasteners to a roof of the vehicle.

18. The method of claim 16, wherein the grab handle is configured for attachment by threaded fasteners to the bracket.

19. The method of claim 16, wherein the grab handle and light source are positioned on a visible side of the headliner.

20. The method of claim 19, wherein the light source is serviceable from the visible side of the headliner.

* * * * *